(No Model.)

M. V. CARR.
DEVICE FOR TURNING CHEESE.

No. 408,792. Patented Aug. 13, 1889.

Witnesses.

Inventor.
M. V. Carr
By Risley & Pary
attys

UNITED STATES PATENT OFFICE.

MILO V. CARR, OF SMITHVILLE, NEW YORK.

DEVICE FOR TURNING CHEESE.

SPECIFICATION forming part of Letters Patent No. 408,792, dated August 13, 1889.

Application filed February 18, 1889. Serial No. 300,276. (No model.)

*To all whom it may concern:*

Be it known that I, MILO V. CARR, a citizen of the United States of America, and a resident of the town of Smithville, in the county of Chenango and State of New York, have invented certain new and useful Improvements in Devices for Turning Cheese; and I do hereby declare that the following is a full, clear, and exact description thereof, which will enable others skilled in the art to which it appertains to make and use the same, reference being had to the accompanying drawings, and to the letters of reference marked thereon, which form part of this specification.

My invention relates to mechanism for "turning" cheese.

It is usual in the manufacture of cheeses to form or shape them in the form of a short cylinder having flat ends, and during the process of "curing" it is customary to place the cheese upon one of its flat ends upon a table, and in order to preserve the form of the cheese during the process of curing and to properly "cure" the same, it is necessary to "turn" the cheese by placing it upon the other end or flat side. This process of turning in well-regulated factories should be done every day, involving a great amount of labor. At the time of turning the cheese it is necessary to "grease" it by smearing the end last turned up with an oily or greasy substance.

It is the object of my invention to provide mechanism for turning the cheese, and which will facilitate the process of "greasing," besides providing other advantages which will be readily understood by those skilled in the art to which my invention pertains.

Figures 1, 2:
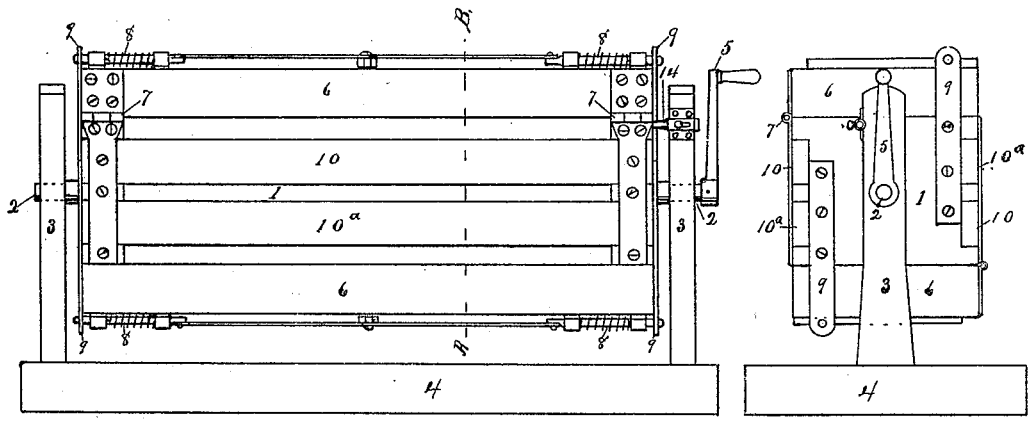
Figures 3, 4:
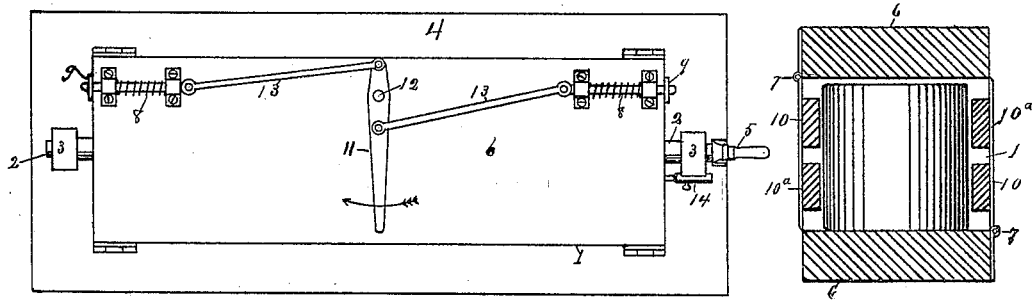

In the drawings, Figure 1 shows a side view of my device. Fig. 2 shows an end view taken at the right hand of Fig. 1. Fig. 3 shows a top view of the device. Fig. 4 shows a section taken on line A B of Fig. 1.

Like figures or letters of reference refer to like or similar parts in the several figures of the drawings.

Referring to the drawings, 1 indicates a rectangular box, crate, or receptacle, mounted upon gudgeons 2 2, which have bearings in standards 3 3. Standards 3 may be affixed to the floor or to a base-piece 4. Mounted on the outer end of one of the gudgeons is a crank and handle 5, by means of which the receptacle 1 may be turned upon its gudgeons. Receptacle 1 is preferably long enough to contain several cheeses in a single file, and is provided upon opposite sides with covers or lids 6 6, each hinged to the body of the receptacle at 7 7, Figs. 1, 2, and 4. Covers 6 are preferably made heavy, as the one that is under must sustain the weight of the cheese contained in the receptacle. The covers 6 are secured in a closed position by spring catches or bolts 8 8, which engage pieces 9 9, secured to the receptacle and projecting in such a position as to be engaged by catches 8. I provide a lever 11, pivoted to the cover at 12, and having rods 13 connecting it with the catches 8, so that by moving the handle of the lever, as indicated by the arrow in Fig. 3, the catches or bolts are simultaneously withdrawn. The sides of the receptacle are preferably constructed of strips or slats 10 10 10 10, of which slats those marked a a, Figs. 1, 2, and 4, being those adjacent to the opening edges of the covers 6, are preferably removable to admit of more easy access to the interior of the receptacle 1 in placing cheeses in or removing them therefrom, or in greasing cheeses contained therein. A catch or bolt 14 upon standard 3 is provided for engaging the end of the receiver, by means of which the receiver may be secured in fixed position with either of the covers 6 uppermost.

The internal dimensions of the receiver on cross-section with reference to the size of a cheese are in width a little more than the diameter of the cheese and in depth a little more than the depth of a cheese, so that when both covers are closed the cheese will not touch both covers at the same time.

The use or operation of the device is as follows: The receiver is secured in position with one of the covers uppermost by means of catch 14, the cover being opened, and, if preferable, the bar 10$^a$ may be removed. The cheeses may then be placed in the receptacle, as many as the length of the receptacle will admit, setting side by side. The cheeses contained in the receptacle may all be simultaneously turned by withdrawing catch 14, and by means of handle 5 turning the receiver upon its gudgeons, so as to bring the other cover uppermost, when it is again fastened by catch 14. By this half-revolution of the receiver the cheeses are placed upon the other end upon the other cover. The cheese may be readily and easily greased by opening the cover 6 that is uppermost and greasing the upper end of the cheese, then turning, and greasing again.

Various alterations and modifications in and from the construction described may be made without departing from the spirit of my invention.

What I claim as new, and desire to secure by Letters Patent, is—

1. The herein-described cheese-turner, consisting of the receptacle having end pieces, bars forming sides secured to the end pieces, the hinged covers 6 6 upon opposite sides of the receptacle, the catches for securing the covers of the receptacle in closed position, the removably-secured side bar adjacent to the opening edge of the covers and mounted upon gudgeons in the end pieces, the bearings for the gudgeons, and the catch for securing the receptacle in position with either cover uppermost.

2. The herein-described cheese-turner, consisting of the receptacle 1, having end pieces and bars forming sides secured to the end pieces, the hinged covers 6 6 upon opposite sides of the receptacle, the spring-actuated bolts for securing the covers in closed position and the operating-lever and connecting-rods, the removably-secured side bars adjacent to the opening edges of the covers and mounted upon gudgeons in the end pieces, the bearings for the gudgeons, and the catch for securing the receptacle in position with either cover uppermost.

3. In a cheese-turning device, the combination of the rectangular receptacle having covers 6 6 and the removably-secured bars 10ª, said receptacle being mounted upon gudgeons, the bearings for the gudgeons, the catches for securing the covers in closed position, and the catch for securing the receptacle in position with either cover uppermost.

In witness whereof I have affixed my signature in presence of two witnesses.

MILO V. CARR.

Witnesses:
C. E. KEOUGH,
J. J. FLANAGAN.